United States Patent [19]

Sperling et al.

[11] Patent Number: 5,112,531
[45] Date of Patent: May 12, 1992

[54] OPTOELECTRONIC DEVICES

[75] Inventors: Leslie H. Sperling, Bethlehem; Clarence J. Murphy, Stroudsburg; Warren A. Rosen, Hartsville; Himanshu Jain, Bethlehem; Warren N. Herman, Huntingdon Valley, all of Pa.

[73] Assignee: The United States of America as represented by the Secretary of the Navy, Washington, D.C.

[21] Appl. No.: 554,051

[22] Filed: Jul. 16, 1990

[51] Int. Cl.⁵ .............. C09K 19/52; F21V 9/00; G02B 5/02; C08F 20/34
[52] U.S. Cl. .............. 252/582; 252/299.01; 526/308; 526/311; 526/317.1
[58] Field of Search .............. 252/589, 582, 299.1; 526/304, 317.1, 311

[56] References Cited

U.S. PATENT DOCUMENTS

| 4,748,074 | 5/1988 | Pantelis et al. | 428/220 |
| 4,898,691 | 2/1990 | Borzo et al. | 252/589 |
| 4,935,292 | 6/1990 | Marks et al. | 428/220 |

FOREIGN PATENT DOCUMENTS 2183228  7/1990  Japan .............. 252/582

Primary Examiner—Robert L. Stoll
Assistant Examiner—C. Harris
Attorney, Agent, or Firm—James V. Tura; James B. Bechtel; Susan E. Verona

[57] ABSTRACT

This invention relates to acrylic polymers and more specifically to polyacrylamides and polyacrylates such as poly{2-[(N-2-methyl-5-nitrophenylamino)ethyl acrylate]} and poly[(N-2-methyl-4-nitrophenyl)acrylamide]. These acrylic polymers are particularly useful as nonlinear optical components in various electrical devices for processing optical amplifiers, generators, computational devices and the like.

6 Claims, 4 Drawing Sheets

FIG 2a
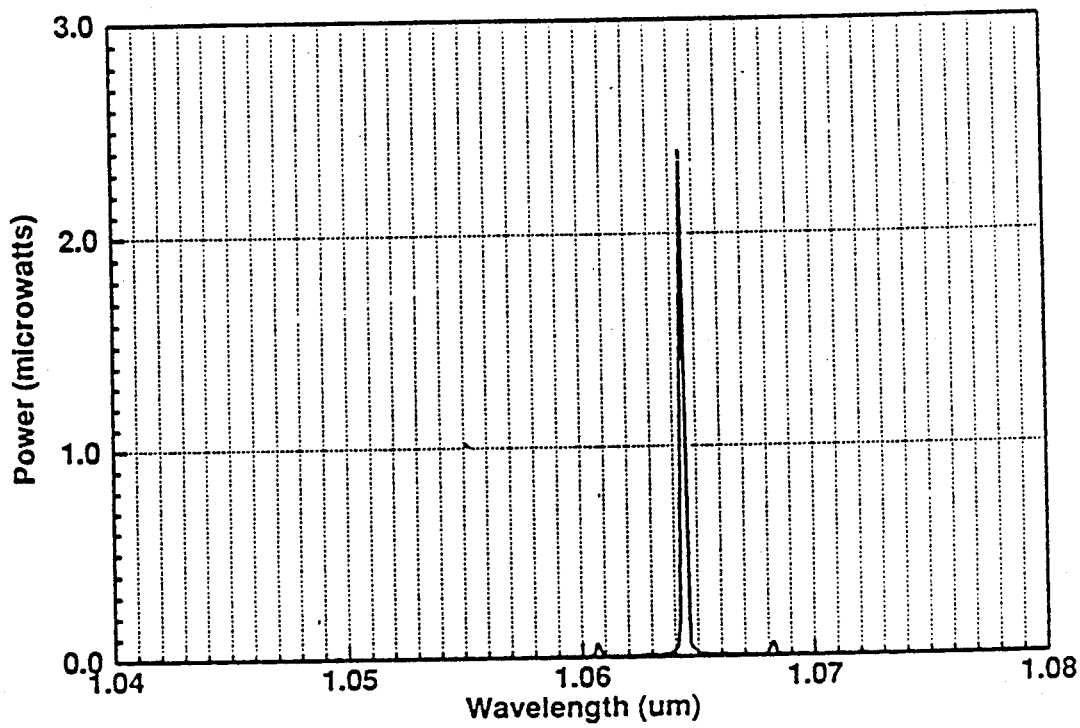
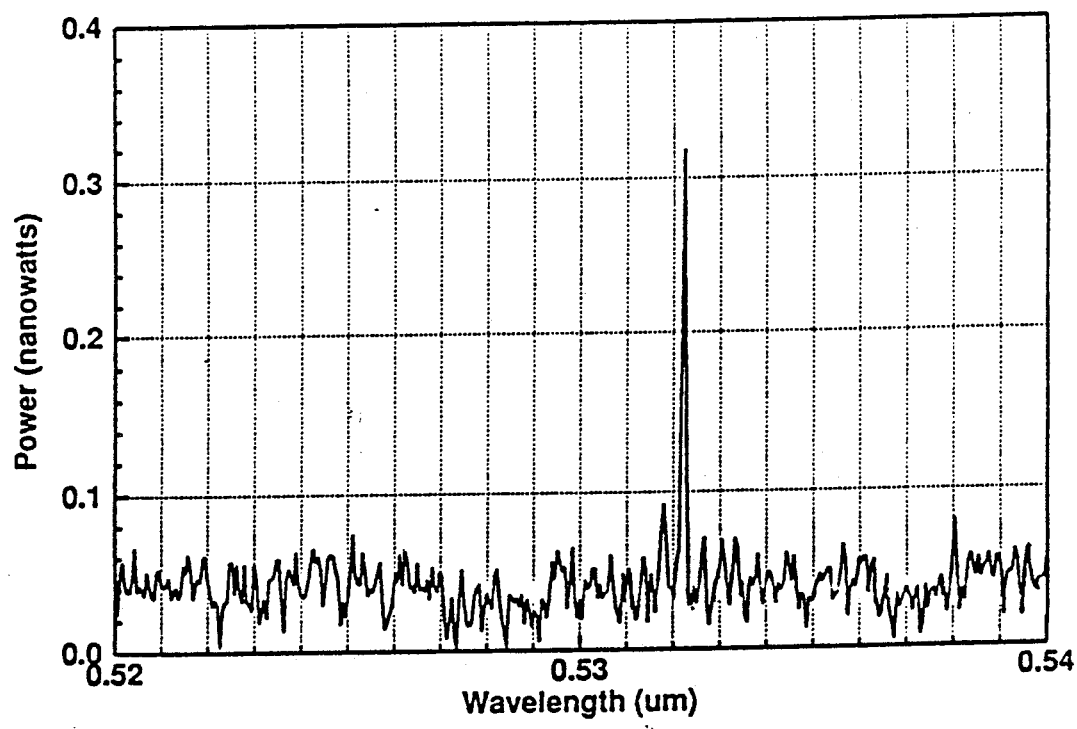
FIG 2b $$\triangle \beta = \beta_2 - \beta_1$$

OPTOELECTRONIC DEVICES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to acrylic polymers and more specifically to polyacrylamides and polyacrylates capable of exhibiting nonlinear optical responses in an electric or electromagnetic field. Specifically, this invention is directed to the use of these acrylic polymers as the nonlinear optical component in various electrical devices for purposes of processing optical signals.

Recent developments have led to increased use of optical components in various electrical and optoelectronic devices, i.e. devices containing optical components which are either active or passive components. These devices include, for example, the use of optical materials in second harmonic generators, modulators e.g. spatial light modulators, phase shifters, optical amplifiers, laser technology, interferometers, optical switches, logic gates, communications and computational devices, and alike. It is generally known that various organic compounds and particularly polymeric materials can exhibit nonlinear optical responses which in some instances is larger than some of the inorganic materials.

Nonlinear optics is primarily concerned with the interaction of lightwaves with matter in a way that is not linear in applied and/or optical electromagnetic fields. Current practice utilizes nonlinear crystals such as KDP (potassium dihydrogen phosphate), lithium niobate, etc. for the effects and devices described herein. However, these crystals are difficult and expensive to grow and difficult to use in making optical devices. In addition, these materials exhibit relatively small nonlinear effects and suffer from optical damage at high laser input power. Laser frequency converters, for example, are based generally on inorganic crystals that respond nonlinearly to incident high power optical radiation by changing the frequency of the radiation. Second harmonic generation (SHG) results when optical radiation passes through a transparent medium having an electric susceptibility that is a nonlinear function of the radiation field. In theory, any optically transparent medium without inversion symmetry can produce second harmonic generation provided that the electric field of the electromagnetic radiation is sufficiently large. For example, a light transmitting solid medium should satisfy two structure requirements in order to achieve efficient second harmonic generation. First the optical medium must not be symmetrical about a center point (the nonlinear second order susceptibility vanishes in an optical medium that possesses a centro symmetric structure). Second for maximum second harmonic generation the optical medium must possess a means for making the coherence length large compared to the length of the material, e.g. a propagation direction whereby the optical medium birefringence cancels the natural dispersion leading to a state of equal indices of refraction at the fundamental and second harmonic frequencies.

The advantage of acrylic polymers in comparison to other compounds is that these polymers exhibit high mechanical strength and chemical stability. The addition of an optically nonlinear side-chain to the polymer backbone provides desirable features, e.g. a large nonlinear optical molecular susceptibility in a solid medium. For example, nonlinear optical materials comprised of polymerized aromatic compounds are disclosed in U.S. Pat. No. 4,431,263 where the theoretical principles of nonlinear behavior of organic systems are discussed. U.S. Pat. No. 4,199,698 discloses the use of a single crystal of 2-methyl-4-nitroaniline in nonlinear devices Further, U.S. Pat. No. 4,748,074 discloses nonlinear optical compositions comprising copolymers with an additive having a molecular optoelectronic activity e.g. methyl-N-(2,4-dinitro phenyl)alaninate Thus, there is a continuous effort to develop new nonlinear optical polymeric systems for devices such as laser modulation and deflection, information control in optical circuitry, light valves and various types of optical switches, etc.

While certain organic molecules are known to exhibit extremely large optical nonlinearities, it was not until recently that these materials have been used in electro-optic devices. The materials primarily used for such optic devices include the inorganic crystals, e.g., lithium niobate which has a reasonably high electro-optic coefficient; they are used primarily because large crystals can be manufactured with low defect densities. Although there are other organic and inorganic materials which are more effective than lithium niobate, these materials are based on second harmonic generation (SHG) tests of materials in the aqueous or powder form. It is essential that the material have a uniform large solid form before it can be considered for electro-optic uses. One of the advantages of utilizing acrylic polymers is because of the ability to alter the molecular structure and thereby optimize the nonlinear optical and physical properties of the polymers. This ability to synthesize specific polymeric structures makes the material particularly useful for the fabrication of various electro-optic devices

SUMMARY OF THE INVENTION

This invention specifically relates to acrylic polymers capable of exhibiting nonlinear optical responses in an electric or electromagnetic field and to the method of preparing said polymers and more particularly to polyacrylamides and polyacrylates having average molecular weights above about 15,000 gm/mol and/or such polymers in network form, and to specific acrylic polymers useful in electro-optic devices for processing signals. For purposes of this invention the term acrylic polymer(s) includes the polymeric amides and esters derived from the various acrylic acids and/or acrylic acid anhydrides as illustrated by the formulae disclosed herein.

Accordingly, it is an object of this invention to provide an acrylic polymer capable of exhibiting nonlinear optical responses in an electric or electromagnetic field and the use of these polymers in various electric and/or optical devices.

It is another object of this invention to provide an acrylic polymer which exhibits a large second and third order optical nonlinearity. These polymeric materials are useful in such applications as second harmonic generation (in which the frequency of an optical wave is doubled) and optical phase conjugation, and in devices which rely on the Pockels or Kerr effects to change the refractive index It is a further object of this invention to provide a process of preparing nonlinear acrylic polymers capable of exhibiting optical responses in an electric or electromagnetic field.

It is still a further object of this invention to provide electro-optic devices e.g. switches etc. capable of processing optical signals by use of a component containing the nonlinear acrylic polymers of this invention.

BRIEF DESCRIPTION OF THE DRAWINGS

FIGS. 2a and b shows the output of the spectrum analyzer for 1.064 um and 0.532 um, respectively, light using poly[N-(2-methyl)-4-nitrophenyl]acrylamide.

DETAILED DESCRIPTION OF THE PREFERRED EMBODIMENTS

Figure 1:
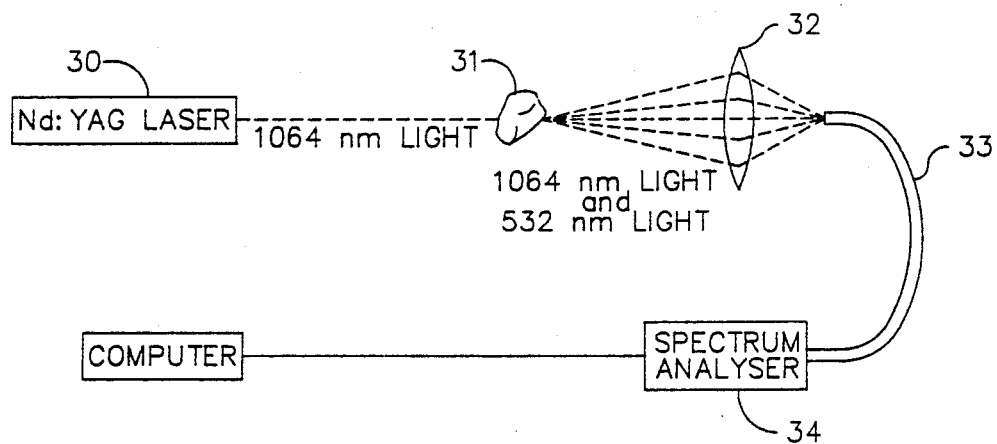
FIG. 1 is a device used for measuring the efficiency of second harmonic generation.

This invention relates to an acrylic polymer capable of exhibiting nonlinear optical responses in an electric or electromagnetic field having the formula I:

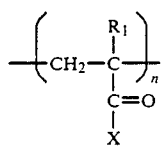

where X is a monovalent moiety selected from the group consisting of

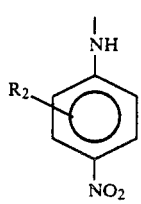
(a)

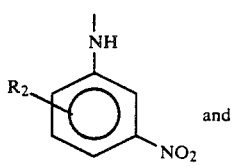
and
(b)

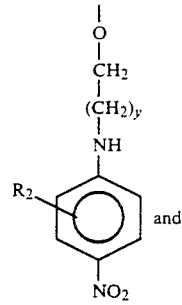
and
(c)

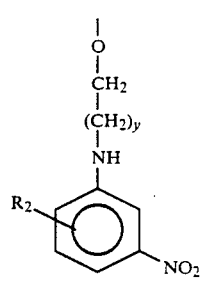
(d)

where $R_1$ is either hydrogen, methyl or ethyl group, $R_2$ is a lower alkyl group of 1 to 5 carbon atoms, y has a value ranging from 0 to about 5 and n has a value ranging from about 50 to about 10,000.

A preferred acrylic polymer is specifically characterized wherein X is the moiety (a)

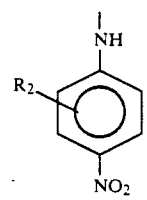

Another preferred acrylic polymer is specifically characterized wherein X is the moiety (c)

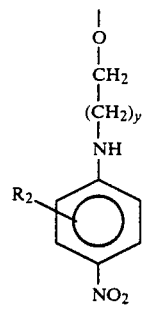

Other preferred acrylic polymers may be specifically characterized wherein $R_1$ is hydrogen, $R_2$ is a methyl group and Y has the value of zero or 1. Specific acrylic polymers i.e. amides and esters are identified as poly [N-(2-methyl-4-nitrophenyl) acrylamide] and poly [N-(2-methyl-4-nitrophenyl) amino methyl or ethyl acrylate].

The process for preparing the acrylic polymers capable of exhibiting nonlinear optical responses in an electrical or electromagnetic field comprises reacting, for example, 2-methyl-4-nitroaniline with an acryloyl halide e.g. chloride in the presence of a hydrogen chloride scavenger and subsequently polymerizing the reaction product with a catalyst e.g. peroxide, to obtain poly [N-(2-alkyl-4-nitrophenyl) acrylamide]. An alternate process for preparing the acrylic polymers capable of exhibiting nonlinear optical responses comprises reacting a poly(acryloyl halide) e.g. the chloride with 2-alkyl-4-nitroaniline in the presence of a hydrogen chloride scavenger and an organic solvent to obtain poly [N-(2-alkyl-4-nitrophenyl) acrylamide]. These polymers are further characterized wherein n in the formula has a value ranging from about 50 to 10,000 and preferably from about 1,000 to 2,000. These polymers may be characterized further as having an average molecular weight, determined by its intrinsic viscosity ranging from about 5,000 to 1,000,000 gm/mol with an index of refraction of about 1.60 and a glass transition temperature, $T_g$, of about 200° to 220° C.

The following example illustrates a method of preparing the acrylic polymers of this invention.

EXAMPLE A

Poly(acryloyl chloride), 0.91 g (0.01 mer moles) and 0.79 g (0.01 moles) of pyridine were dissolved in about 25 ml of dioxane. The pyridine scavenges the hydrogen chloride. To this solution was added 1.82 g (0.012 moles), about 20% excess, of 2-methyl-4-nitroaniline (MNA) in 20 ml of dioxane. The reaction mixture was stirred and refluxed at approximately 90° C. for 8 hours under an atmosphere of nitrogen.

The reaction product was poured into water and the solid was filtered off, washed with acetone to remove unreacted MNA and then dried under vacuum at 100° C. The reaction is formulated as follows:

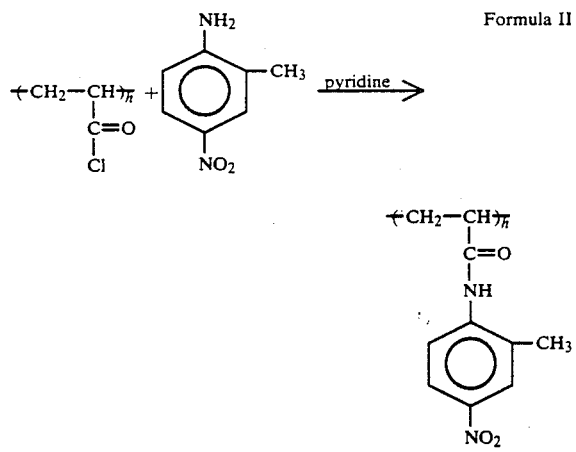

The acrylic polymer obtained in Example A was further purified by dissolving in pyridine followed by reprecipitation in a nonsolvent i.e. methanol. The acrylic polymer was then filtered and washed with alcohol on a Buchner funnel with fritted disk and then dried. The dried polymer was cast into thin films on glass from a pyridine solution. The refractive index of the film was determined using an Abbe Refractometer.

Elemental analysis of samples from Example A were completed after drying for about one hour at 105° C. The results of the analysis are set forth in Table I:

TABLE I

|      | C     | H    | N     | O     | Cl (%) |
|------|-------|------|-------|-------|--------|
| Theo.| 58.25 | 4.89 | 13.59 | 23.28 | 0      |
| CT#1 | 58.33 | 5.28 | 10.63 | 25.37 | 0.39   |
| RP#1 | 58.34 | 5.14 | 11.12 | 25.23 | 0.28   |

The refractive index of samples of Example A was determined to be in the range of 1.601 to 1.602. The infrared spectra of samples of a film deposited on quartz was also determined. The glass temperature, $T_g$, of samples from Example A was approximately 210° C. with a broad endothermic peak starting around 20° and ending around 130° C. An alternate method for synthesizing the polymer comprises reacting acryloyl chloride with MNA i.e. (2-methyl-4-nitroanaline) and then polymerizing the product e.g. photopolymerizing the fully reacted monomer.

A unique process for preparing the acrylamide polymers of this invention comprises the reaction of 2-methyl-4-nitroaniline (MNA) with acryloyl chloride in the presence of pyridine as the scavenger for hydrogen chloride at temperatures of about 25° C. The reaction product comprises N-(2-methyl-4-nitrophenyl) acrylamide which was subsequently polymerized in the presence of a peroxide catalyst to obtain poly [N-(2-methyl-4-nitrophenyl) acrylamide].

As an alternative process the poly (acryloyl chloride) was reacted with 2-methyl-4-nitroaniline (MNA) in the presence of pyridine as the HCl scavenger with dioxane as the solvent. The reaction was carried out over a period of about eight hours at 90° C. to obtain poly [N-(2-methyl-4-nitrophenyl) acrylamide]. These acrylamide polymers have average molecular weights ranging from about 15,000 to 1,000,000 gram/mol. A crosslinked, grafted, block copolymer, or a blend of the acrylic polymers of this invention may be used also a the optical component in an electrical device.

It is obvious (from the above) also from this disclosure that different isomers and homologs of MNA may be utilized in preparing the acrylic polymers of this invention. For example, the anilines used in accordance with this invention may include 2-methyl-5-nitroaniline or 2-methyl-3-nitroaniline, etc. In addition, the methyl substituent may be replaced by anyone of the homolog series including $—CH_2—CH_3$, or $—(CH_2)_x—CH_3$, etc. where x has a value ranging from 2 to 5. Anyone of these anilines may be used in preparing the polyacrylamides or acrylates in the process of this invention. In addition to pyridine, other halide scavengers that can be used including such compounds as trimethylamine, N,N-dimethylanaline, etc. It is further obvious (from the above) that in addition to the monomers and polymers being derived from either acrylic acid, methacrylic acid or ethacrylic acid, that the anhydrides of these acids may be utilized also in preparing the polyacrylates and polyacrylamides of this invention. Similarly, it is obvious (from the above) that any of the acryl halides e.g. acryloyl chloride, bromide, iodide or fluoride may be used as the acrylic derivative.

In preparing the acrylic polymers in accordance with this invention it was found that in order to provide more flexibility to the sidechains of the polymeric chain, spacer groups such as $—(CH_2)—_x$ may be included in the side chain. This may be accomplished, for example, by carrying out the reaction with 2-methyl-4-nitroaniline (MNA) and 2-chloroethanol in the presence of a HCl scavenger to obtain N-(2-hydroxyethyl)-2-methyl-4-nitroaniline. This reaction product is then reacted with either acryloyl or poly(acryloyl chloride) to produce poly(2-[N-2-methyl-4-nitrophenyl amino) ethyl acrylate]) with spacer groups as shown in formula III:

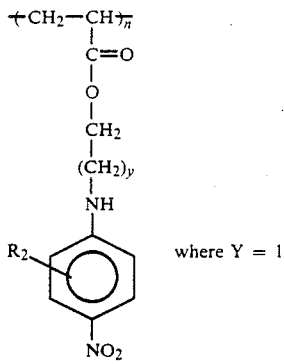

where Y = 1

It is further obvious that the 2-methyl-4-nitroaniline (MNA) can be replaced with either 2-methyl-5-nitroaniline or 2-methyl-3-nitroaniline. The N-(2-hydroxyalkyl)-2-methyl-4-nitroanilines is reacted with either of the acryloyl halides, e.g. poly(acryloyl chloride) to obtain the polymer with the spacer groups as illustrated by formula III wherein Y has a value ranging from 0–10 and preferably from 0–5. Specifically, depending on the value of Y, the acrylic polymer is identified as poly(2-[N-2-methyl-5-nitrophenylamino)ethyl acrylate] where Y=1 or where Y=0 the polymer is identified as poly[N-(2-methyl-5-nitrophenylamino)methyl acrylate]. Thus, various straight or branch chain spacer groups may be attached to the main chain. Further, in preparing the acrylics i.e. polymers containing spacer groups as illustrated herein any of the omega-halo-1-alkenes may be used to obtain monomers such as 4-[N-(2-methyl-5-nitrophenyl) amino]-1-butene etc. These monomers can be polymerized by methods known in the art to obtain the polymers of this invention.

For purposes of this invention, the polymers in bulk form may be spin coated to a predetermined thickness on a glass or other suitable substrate and used directly for second harmonic generation of unpolarized laser light. For optical modulation, switching, etc. the polymer may be coated onto an optical waveguide or embedded in a channel waveguide. Further, the acrylic polymers of this invention may be fabricated, cast, extruded, molded, coated, spun, laminated, or applied by means of a fluidized bed, electrostatic spray, or with photoresist technology to obtain the appropriate bulk, fiber or film forms e.g. films below one micron During or after such fabrication, an electric or magnetic field can be applied to the acrylic polymer to produce poled or oriented structures In addition, the acrylic polymers of this invention may be oriented by stretching or compression, etc. or by other methods known in the art.

The following procedure is an example of the method used for the purification of the acrylic polymers i.e. PMNAA or poly [N-(2-methyl-4-nitrophenyl) acrylamide]. The impure PMNAA powder was weighed and dissolved in pyridine such that the solution was about 0.1 gram/ml of pyridine. After the solution became clear, the polymer was precipitated from solution by adding methanol. The polymeric precipitate was filtered and washed three times with methanol The polymer was then dried on a Buchner funnel with fritted disc for about 12 hours at room temperature and subsequently dried in a vacuum oven at about room temperature for a period of about 6 hours. The resulting polymer had a grayish white color and was obtained in yields of about 90%.

The purified polymeric powder was then utilized for casting films using a unique method. First, purified polymeric powder was dissolved in pyridine to a 0.1 gram/ml concentration. Second, a thin layer of the solution of the PMNAA polymer was spread onto the surface of clean mercury and allowed to evaporate slowly until dried. The polymeric solution was allowed to completely cover the surface of the mercury. Subsequently, a second layer of the polymeric solution was spread onto the first dried film and again allowed to dry. The procedure of spreading and drying additional new layers was continued after the previous layer had completely dried. This sequence of film formation was repeated several times. In order to maintain a good film, the film thickness was stopped after forming seven layers by this method. The result of this procedure was several relatively large pieces of PMNAA polymer. The films of PMNAA were tested for optical behavior under an external electric field.

The refractive index of the film specimens were determined by examining light transmission through the specimens which were first immersed in an oil of known refractive index. The specimens were sandwiched between two glass plates containing a drop of oil. The edge of the film was then examined under an optical microscope under slightly de-focussed conditions. The appearance of two parallel images of the edge suggested discrepancy in the refractive indices of the oil and the polymer. By systematically changing the oils of varying refractive indices, the refractive index of the polymer was found to be 1.604+ −0.002.

The nonlinear optical coefficient $d^{(2\omega)}$ of the acrylic polymers can be estimated by second harmonic generation (SHG) as shown in FIG. 1. SHG refers to the phenomenon wherein light of a particular frequency is passed through a nonlinear material and is in part converted to light of twice the original frequency. The efficiency $\eta$ with which the conversion takes place is given by the equation:

$$\eta = \frac{p(2\omega)}{p(\omega)} = 2\left(\frac{\mu}{\epsilon_0}\right)^{3/2} \frac{\omega^2 d^2 l^2}{n^3} \left(\frac{p(\omega)}{A}\right) \frac{\sin^2(\Delta k l/2)}{(\Delta k l/2)^2}$$

where $p^{(\omega)}$ and $p^{(2\omega)}$ are the power in the incident and frequency doubled beam, respectively, $\mu$ and $\epsilon_o$ the permeability and permittivity, $\omega$ the frequency, d the nonlinear optical coefficient, l the thickness of the sample, A the area of the incident beam, and $\Delta k$ the difference in wave numbers between the incident and frequency doubled beams (i.e., a measure of the phase matching in the material). The $\Delta k$ is not known for this polymer, so that only a lower bound for d may be determined from the equation (i.e. by setting sinc($\Delta k l/2$)=1).

The specific apparatus used for observing second harmonic generation is shown in FIG. 1. Here, light from a 5 watt Nd:YAG laser, 30 ($\lambda = 1.064$ microns) is passed through the polymeric sample, 31, which is mounted on edge by adhering it to a piece of tape attached to a mounting bracket. A positive silica lens, 32, is used to focus the resulting diverging beam onto the face of a 100/140 micron fiber optic cable, 33, which carries the light to an Advantest TQ8345 optical spectrum analyzer, 34. The spectrum analyzer is then used to make measurements of the incident power in both spectral regions of interest (i.e. 1.064 and the frequency-doubled wavelength of 0.532 microns).

The graphs in FIG. 2 shows the output from the spectrum analyzer at 1.064 and 0.532 microns, respectively using poly[N-(2 methyl-4-nitrophenyl)acrylamide]. The signal at 1.064 microns represents the input to the polmeric sample at the fundamental frequency while the signal at 0.532 microns represents the frequency doubled, or second harmonic, signal due to the nonlinear behavior of the polymer. The efficiency may be estimated directly from the above equation. Another method is to replace the polymer with a nonlinear crystal of known d, oriented to achieve phase matching at the frequencies of interest, and then again measuring $\eta$. A lower bound for the nonlinear optical coefficient of the polymer can then be obtained in terms of that crystal as illustrated by the equation:

$$d_{poly} \gtrsim d_{xtal} \left( \frac{l_{xtal}}{l_{poly}} \right) \left( \frac{n_{poly}}{n_{xtal}} \right)^{3/2} \left( \frac{\eta_{poly}}{\eta_{xtal}} \right)^{1/2}.$$

For the nonlinear crystal, a 4 mm thick piece of KD*P (obtained from Cleveland Crystal) was used. From the efficiency as determined by the method as shown in FIG. 2 and similar data for the KD*P, a lower bound of $0.75 \times 10^{-22}$ MKS, or 16 times that of KD*P was obtained.

Figure 3:
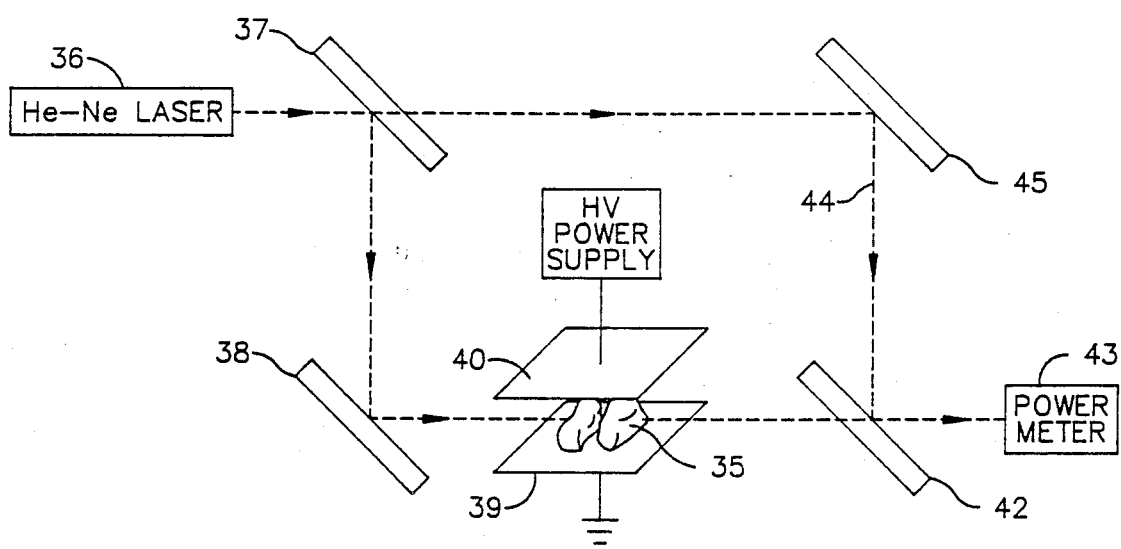
FIG. 3 is an embodiment of a Mach-Zehnder Interferometer.

The electro-optic (or Pockels) coefficient may be measured also by using a Mach-Zehnder interferometer as shown in FIG. 3. Here light from a laser 36 is split by the splitter 37 and reflected by mirrors 38 and 45. The reference beam 44, and sample beam 46 are recombined by beam splitter 42 and detected by meter 43. The phase shift through the polyacrylic sample 35 due to the change in refractive index, $\delta n$, is given by the equation:

$$\delta \phi = \frac{2\pi l}{\lambda} \delta n,$$

where $$\delta n = -\frac{1}{2} n^3 r E.$$

where l is the thickness of the sample, $\lambda$ the wavelength, n the refractive index, r the electro-optic (Pockels) coefficient, and E the applied electric field. Thus, the sensitivity of the measurement increases with larger l. However, the thickness of a stack of the sample is limited by the scattering and irregularities to about 0.4 mm. This means that for a minimum detectable phase shift of about $\pi/2$ and an electric field of $10^6$ volts/meter, the electro-optic coefficient of the acrylic samples would have to be about ten times greater than that of LiNbO$_3$($30 \times 10^{-12}$MKS).

Figure 4:
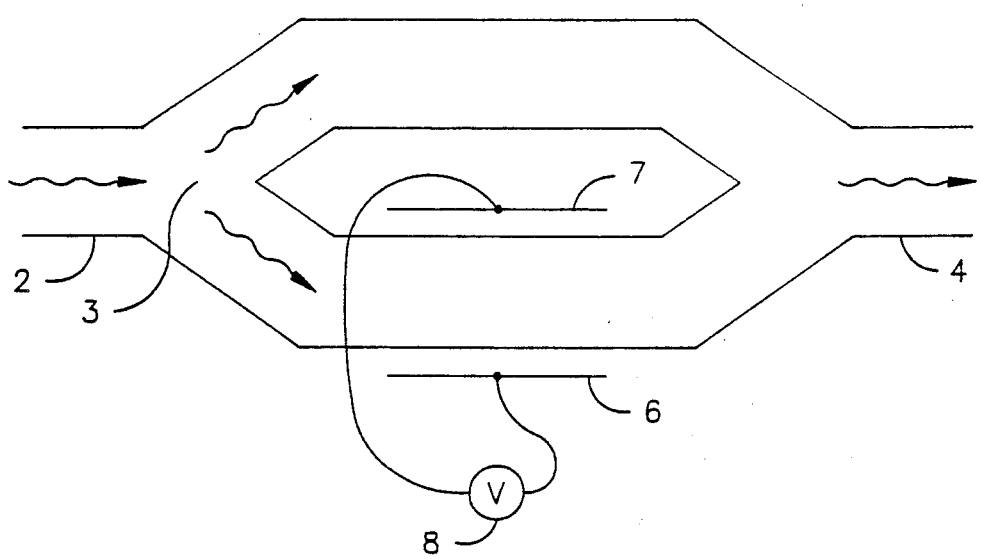
FIG. 4 is the diagram of a channel waveguide Mach-Zehnder Interferometer.

Another method of using the acrylic polymers of this invention is illustrated in the Mach-Zehnder device as shown in FIG. 4. Here, light enters the waveguide at 2 and is split into two beams of equal intensity at 3. These two beams interfere when re-combined at 4. Whether the interference is constructive or destructive (i.e. the switch is "on" or "off") depends on the difference in phase between the two beams at 4 introduced by any differences in path lengths or refractive indices seen by the two beams. If the lower arm is made of a nonlinear polymer, the phase difference can be changed by applying an electric field 8 between the plates of the electrodes 6 and 7, thereby changing the refractive index.

Figure 5:
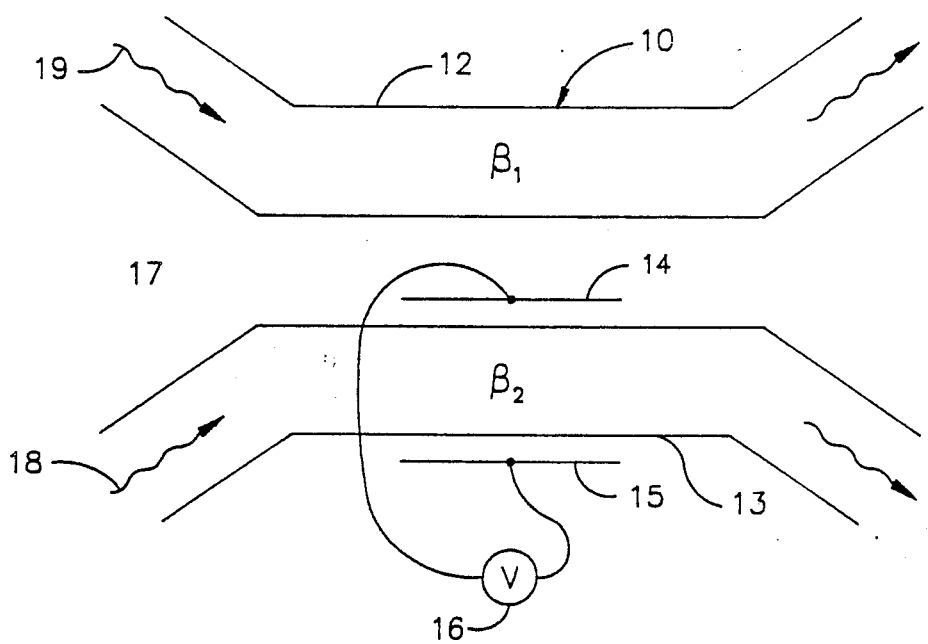
FIG. 5 is an embodiment of a Delta-Beta Switch.

Another example of using the acrylic polymers in an electrical device is the delta-beta switch 10 as shown in FIG. 5. Here, two waveguides 18 and 19 are brought into close proximity over some interaction length. If the separation is small, light will couple from one waveguide into the other via an evanescent field 17. The amount of light coupled depends on the difference in propagation constants in the two guides 12 and 13. (The propagation constants are usually denoted by beta, hence the name "delta beta" switch) The propagation constant is directly related to the refractive indices of the guide and the surrounding material. If the guide or its surroundings is made of a nonlinear polymer the coupling may be changed by applying an electric field 16 between two electrodes 14 and 15.

Figure 6:
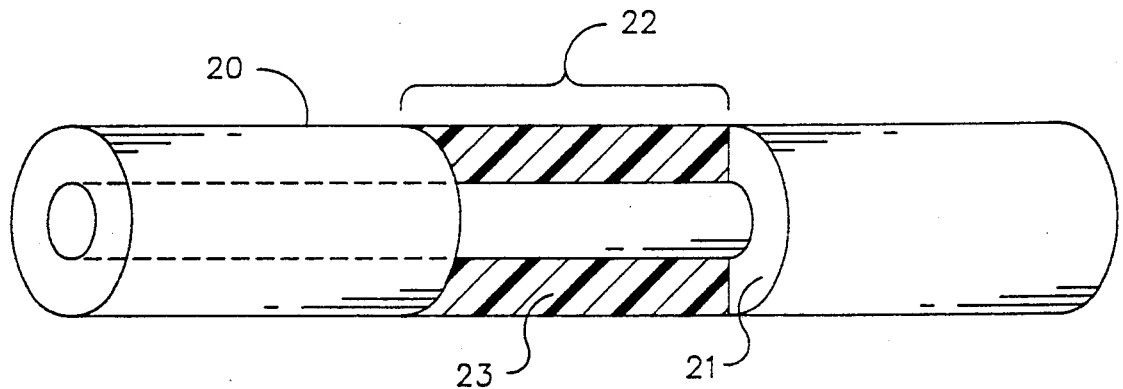
FIG. 6 is an embodiment of a fiber optic modulator.
Figure 7:
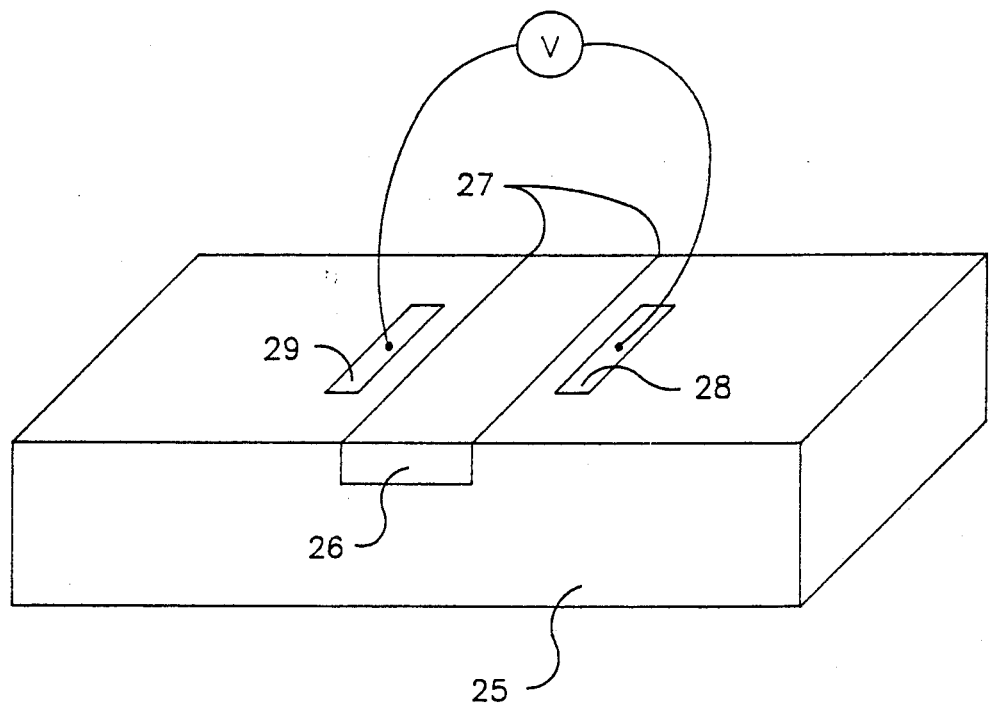
FIG. 7 is an embodiment of a channel waveguide optic modulator.

An example of an optical modulator is shown in FIGS. 6. FIG. 6 shows a fiber optic cable 20 wherein the cladding 21 has been removed over a small section 22 and replaced by the acrylic polymer 23. By applying an electric field, the refractive index of the polymer is changed, switching the fiber between the guiding and nonguiding state. FIG. 7 shows an integrated optic channel waveguide device 25 in which the polymer 26 is placed in a narrow channel 27 between two electrodes 28 and 29 which provide the electric field. In order for these devices to operate, the polymer must be poled to align the side chains of the molecules. A novel poling method comprises dissolving the polymer in a solvent and then forming a coating on a substrate and placing the coated substrate in an electric field to dry. It is believed that because the molecules are more mobile in solution that a high degree of alignment, and hence a greater electro-optic effect is achieved.

Depending on the end use of the polymer, the NLO activity may be increased or modified by the incorporation of about 0.0001-10% by weight of free NMA or its derivatives into any of the acrylic polymers of this invention. Moreover, other additives including dyes, reinforcers, fillers, antioxidants, surface active agents, UV absorbers, plasticizers, mold release agents, emulsifiers, dispersions in water or other fluids, or any other materials normally found in fabricated polymeric materials may be added as necessary. Thus, for example, the polymer may be dispersed in the water, or water dispersed in the polymer. Dopants other than MNA or isomers may be added, as well as solvents.

It is obvious that there are other variations and modifications which can be made without departing from the spirit and scope of the invention as particularly set forth in the appendant claims.

The invention claimed is:

1. An electrical device for processing optical signals containing an optical component comprising an acrylic polymer capable of changing its refractive index in an electric or electromagnetic field having the formula:

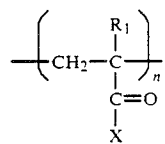

wherein X is a monovalent moiety selected from the group consisting of (a)

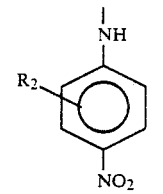

(b)

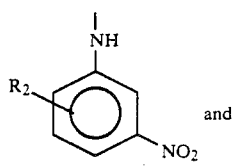

(c)

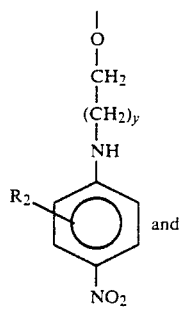

and (d)

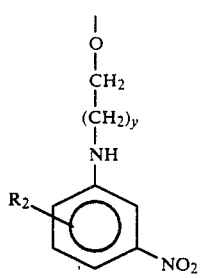

where $R_1$ is either hydrogen, methyl or ethyl group, $R_2$ is a lower alkyl group of 1 to 5 carbon atoms, y has a value ranging from 0 to 10 and n has a value ranging from about 50 to 10,000.

2. An electro optical switch containing an optical component comprising an acrylic polymer exhibiting nonlinear optical responses having the formula:

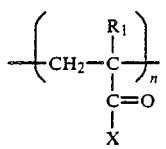

where X is a monovalent moiety selected from the group consisting of (a)

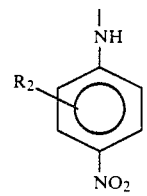

(b)

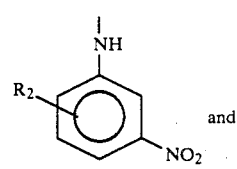

and (c)

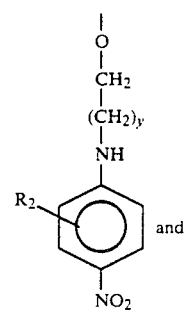

and (d)

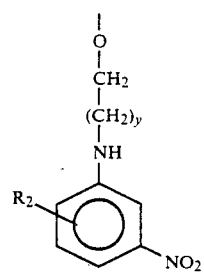

where $R_1$ is either hydrogen, methyl or ethyl group, $R_2$ is a lower alkyl group of 1 to 5 carbon atoms, y has a value ranging from 0 to 10 and n has a value ranging from about 50 to 10,000.

3. An electrical device for processing optical signals containing an optical component comprising an acrylic polymer capable of changing its refractive index in an electric or electromagnetic field having the formula:

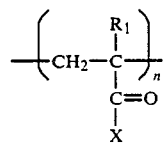

where X is a monovalent moiety selected from the group consisting of (a)

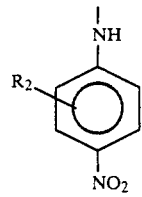

(b)

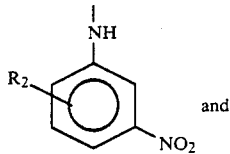 and (c)

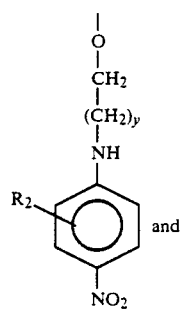 and (d)

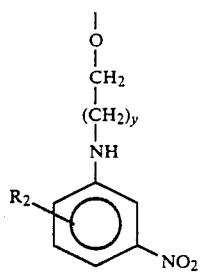

where $R_1$ is either hydrogen, $R_2$ is a lower alkyl group of 1 to 5 carbon atoms, y has a value of 0 and n has a value ranging from about 50 to 10,000.

4. An electro-optical switch containing an optical component comprising an acrylic polymer capable of exhibiting nonlinear optical responses in an electric or electromagnetic field having the formula:

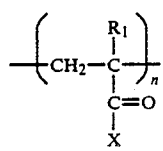

where X is a monovalent moiety selected from the group consisting of (a)

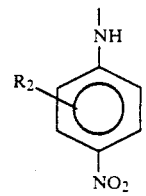

(b)

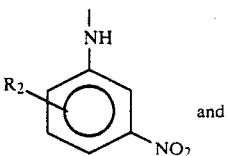 and (c)

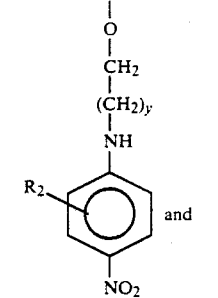 and (d)

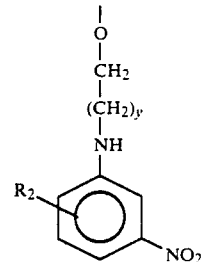

where $R_1$ is either hydrogen, $R_2$ is a lower alkyl group of 1 to 5 carbon atoms, y has a value of 0, and n has a value ranging from about 50 to 10,000.

5. The electro-optical switch of claim 4 further characterized in that the monovalent moiety has the formula (a):

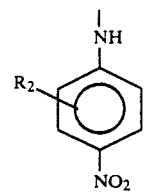

6. The electro-optical switch of claim 4 further characterized in that the monovalent moiety has the formula (c):

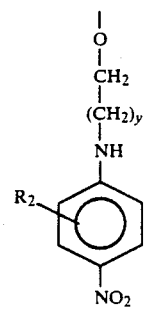

* * * * *